Dec. 24, 1935.　　　　J. A. ZUBLIN　　　　2,025,260
CUTTER FOR DRILL BITS
Filed Oct. 26, 1934

JOHN A. ZUBLIN
INVENTOR

BY *Ferd W Lauir*
ATTORNEY

Patented Dec. 24, 1935

2,025,260

UNITED STATES PATENT OFFICE 2,025,260

CUTTER FOR DRILL BITS

John A. Zublin, Bel Air, Calif.

Application October 26, 1934, Serial No. 750,078

9 Claims. (Cl. 255—71)

The present invention relates to an improved cutter for rotary drill bits of the type shown in my prior Patents 1,859,948, issued May 24, 1932, and 1,758,773 and 1,758,814, both issued May 13, 1930. Bits of this type have a bowl-shaped cutter rotatably mounted on the lower end of the shank, the cutter having outwardly projecting soil cutting blades.

For drilling in rock and hard formations, it is well known that the bit should have a minimum of scraping movement relative to the formation, since an impact or crushing movement breaks down the formation more rapidly. A scraping movement wears by abrasion, and since the rock may be as hard or harder than the steel bit the bit may not be able to wear away the rock. But the same bit when crushing or slicing away the rock will not itself be so badly abraded. Thus the proper blade motion not only removes the formation more rapidly but reduces wear on the cutter and greatly increases its life.

The conditions encountered when milling up fish or side-tracking are similar, as the objects the bit contacts are very hard, but in these cases the bit will catch and hang up if the cutter teeth have corners that can engage the foreign objects. It is also necessary that the bit attack the fish from varying angles to insure disintegration sufficient to allow removal by other methods, for if the bit merely goes by the fish or shoves it to one side the fish will remain in the well wall and may fall back into the well, with the possibility that it will wedge a string of tools in the hole.

Thus it is a general object of my invention to provide a cutter having blades of the proper outline and shape to efficiently drill in hard formations with a minimum of wear on the cutter.

It is also an object of the invention to provide a blade adapted to milling or sidetracking operations and which is not subject to the danger of catching on the metal objects in the hole.

And it is a further object to provide a cutter which will not slide off to one side of the fish but will surely mill it up and remove it.

These objects have been attained in a cutter characteristic of my invention provided with blades each of which has an upper rectangular reaming section with one or more transverse chisel-like cutting edges, and a lower triangular cutting portion with a longitudinal cutting edge. The blade extends vertically over the side of the cutter body, the reaming and cutting sections joining about half way up the body.

How the above and other objects of my invention are attained will be more readily understood from the following description and annexed drawing, in which.

Figure 1:
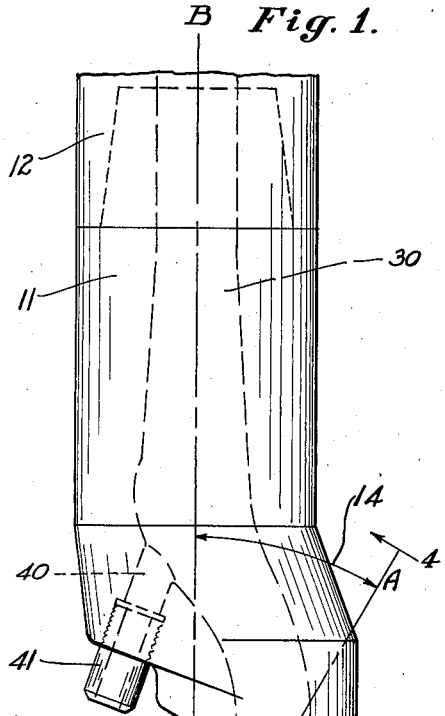
Fig. 1 is a side elevation of a drill bit, with a cutter shown in section.

The construction of the drill bit shank and cutter bearing as illustrated in the above figures is set forth in detail in my copending application Ser. No.741,913, entitled "Improvements in drill bits," filed August 29, 1934, to which reference may be made, so the structure of these parts will be described only briefly. Fig. 1 shows a completely assembled drill bit having a shank portion 11 that is threaded into drill collar 12 on the lower end of a drill column which rotates the bit. The bottom of shank 11 terminates in an inclined cutter bearing generally indicated at 15 and which has its axis A—A inclined at an angle 14 to shank axis B—B which is normally vertical. The cutter generally indicated at 18 is rotatably mounted upon bearing 15, and comprises a bowl-shaped body 20 having internal bearing surfaces complementary to the outer bearing surfaces of the shank bearing. Cutter 18 thus rotates about inclined axis A—A.

Figure 3:
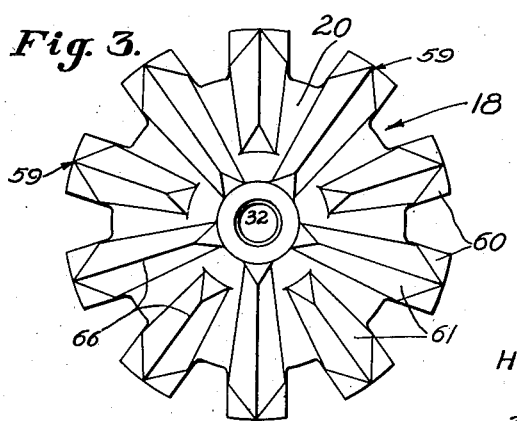
Fig. 3 is a bottom view of Fig. 2.

The lower end of the shank is finished in a cylindrical surface 21 of uniform diameter. The shank end below this cylindrical portion is recessed, as shown in Fig. 3, to receive a thrust cone or pin 22. The upper portion of the thrust pin 30 at 23 is cylindrical, and of the same diameter as the shank above it. The lower portion of the thrust pin is formed with a downwardly disposed frusto-conical surface 24 which merges smoothly with cylindrical surface 23 above. The angle 26 (Fig. 1) between cone axis A—A and cone surface 24 is preferably 45°, making the total central angle of the cone 90°, although this angle may be varied somewhat as explained in my said copending application.

Figure 4:
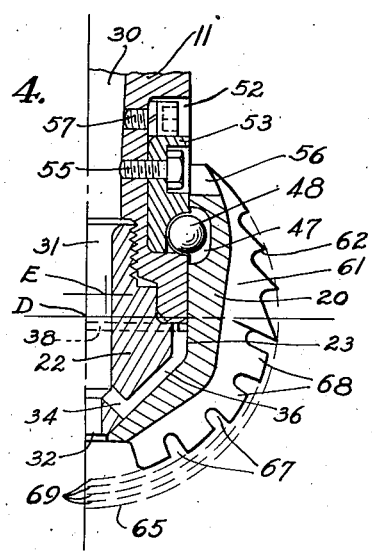
Fig. 4 is a fragmentary semi-section of the cutter and bearing on line 4—4 of Fig. 1.

Shank 11 is provided with an internal streamlined water course 30 through which circulation fluid is introduced into the well. As illustrated in Figs. 1 and 4, water course 30 communicates directly with a central axial water course 31 extending entirely through thrust pin 22 and terminating at its lower end in orifice 32 which admits circulating fluid to the well through the opening in the bottom of cutter body 20.

One or more auxiliary fluid passages 34 lead from axial passage 31 and open directly to conical surface 24. After reaching the cone surface, these passages lead upwardly at 36 to the top of the bearing surface of the thrust pin to a small gap between surfaces 21 and 23 formed by a short, reduced diameter portion of the thrust pin, this gap forming annular passage 38. By means of passages 34, 36 and 38 circulating fluid is delivered from the central water course to lubricate the bearing surfaces. Passages 36 are grooves in the thrust pin surface, and are preferably two in number spaced diametrically opposite to receive a wrench or other means for inserting and removing the thrust pin.

A branch water course 40 leads from passage 30 and discharges through water nozzle 41 which directs a jet of circulating fluid against the cutting blades to wash off adhering dirt particles.

Cutter 18 is placed on bearing 15 by axial movement, and is held against removal by suitable locking means, which includes an annular ball-holding channel formed partly in the shank bearing, by concave annular groove 46 in face 21, and partly in the cutter, by a complementary annular groove 47 in the internal face of body 20, and a plurality of balls 48 within the channel. These balls are of a diameter somewhat less than the total channel width so they do not act as bearing but prevent movement of the cutter axially of the bearing except to a limited extent as provided by the elongation of groove 47.

In order to introduce balls 48 into the channel and remove them therefrom, there is provided recess 52 entirely in shank 11, as shown in Fig. 4. The recess opens to the outside at a point above the cutter and extends down substantially to the bottom of groove 46, the recess being of sufficient depth that the balls may pass easily through it when a cutter is on the shank. After the bit is assembled the balls are held in the channel by means of lock plug 53 which completely fills the lower portion of the recess and is secured in place by screw 55 countersunk into the upper portion of the plug. Screw 55 is located at a point below the top edge of cutter 20 so as to be substantially completely covered by the cutter rim and thus protected against injury.

A notch 56 is made in the rim of the cutter body to afford access to screw 55, as shown in Fig. 4. Notch 56 does not extend as far down as groove 47 so that there is no interruption in the top wall of the groove and a continuous bearing surface is provided in the cutter body above the ball channel. The outside face of plug 53 is convex to form a continuation of the shank bearing.

As a safety measure, the upper portion of recess 52 is occupied by a socket type set screw 57 which serves as an abutment to prevent vertical movement of plug 53, by fitting snugly against the top of plug 53 so as to reinforce screw 55 and, further, to hold plug 53 in position even though lock screw 55 break or be damaged.

As above mentioned, cutter 18 comprises generally a bowl-shaped body 20 upon the outside of which is a plurality of cutting blades 59. Fig. 1 illustrates a basic type of blade which extends generally from the top to the bottom of the bowl and comprises a lower digging portion 60, so termed because it operates chiefly on the bottom of the hole, and an upper reaming portion 61, so termed since it operates chiefly upon the sides of the hole to ream to full gauge the hole produced by blade portions 60. Reaming portion 61 is of generally rectangular cross-section and is serrated to form a plurality of transverse cutting edges 62. Digging section 60 is of generally triangular cross-section with the apex forming a cutting edge 66 that extends longitudinally of the blade.

The center of the cutter is at D on axis A—A, and is the point about which is circumscribed an imaginary sphere 65 which is the limiting surface that locates certain cutting edges and beyond which no teeth extend. The diameter of sphere 65 is the nominal diameter of the cutter, so called since it is the cutter size and consequently the nominal size of the hole drilled, though in practice the actual hole may be slightly oversize. The center D of sphere 65 is on axis A—A preferably at a point below the intersection C with axis B—B, but it may coincide with C according to the requirements of design.

Plane H—H passes through center D perpendicular to cutter axis A—A. As shown, the reaming sections 61 join the digging sections 60 at or near this plane, and may be considered as extending respectively upwardly and downwardly from their junction at or near plane H—H.

Cutting edges 62 extend out from the cutter body a sufficient distance to lie in spherical surface 65, so the transverse edges of a single blade lie in a vertically curved arc. Edges 62 are curved lengthwise to conform to sphere 65. The cutting edge 66 of the digging section is also arcuate in outline but lies entirely within sphere 65, because, although of uniform radius about a center E, this latter point is located above D and to the side of axis A—A between the axis and the blade. With relation to center D, the vertically arcuate edge of the blade is a spiral of progressively changing radius which decreases downwardly along the blade.

Figure 2:
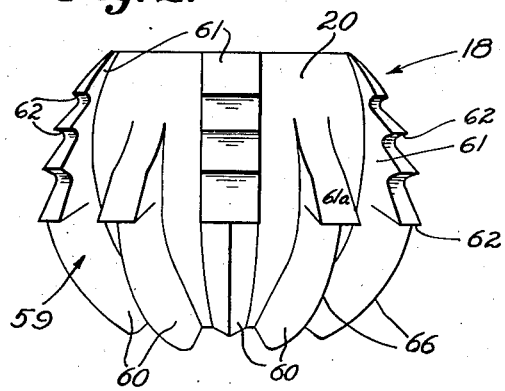
Fig. 2 is a side elevation of my improved cutter shown detached from the shank.

The form of tooth described constitutes a basic form from which modifications may be derived. The cutter as illustrated in Fig. 1 has only this type of blade. A simple modification is illustrated in Fig. 2, in which digging section 60 is as described but reaming section 61a is shortened by removing the top three cutting edges 62 and leaving only the terminal tooth. While this change may be typically effected to a greater or lesser degree on any number of reaming sections, it is here shown typically as being made in alternate blades. The purpose of this change is to reduce the proportion of reaming edges to the total proportion of cutting edges, and it will be obvious that the ratio may be adjusted to any desired value required by the formation being drilled.

A modification of the digging section is illustrated in Fig. 4 in which section 60 is sub-divided by a plurality of slots 67, which may be of any desired number or shape, to form individual teeth 68. The outline of the several teeth 68 may be identical with the outline of blade 60 as in Fig. 1, but it is preferred that the upper corners of the teeth be shortened or moved inwardly from such an outline. This is accomplished (Fig. 4) by making the outlines of the individual teeth in the shape of arcs 69 concentric with D and of varying radii, the radii decreasing progressively downwardly along the cutter.

Inasmuch as cutters of this type are generally used for milling operations and in hard formations, it is preferred that the blades be not too far apart, and good results have been obtained with the use of ten blades as illustrated in Fig. 3. If all the blades were carried completely to the bottom of the bowl they would crowd closely together, thus having a tendency to become packed with cuttings. This tendency is materially diminished by somewhat shortening the digging sections of alternate blades, as illustrated in Fig. 3, so that larger spaces are left between the converging blades. Fig. 2 shows blades having long reaming sections and short digging sections alternating with blades having short reaming sections and long digging sections.

For milling or sidetracking, and in some formations, a cutter with all full blades, as in Fig. 1, is used. The bit, by virtue of its characteristic gyratory movement described in my above mentioned patents, attacks the fish from several different angles and will ride up onto it to break off the highest portions first. If the fish is very irregular, the cutter may not rotate relative to the hole, but will be rocked to reciprocate vertically and the cutting blades, which action wears off the high spots of the fish until the cutter can eventually rotate. It will then, by rotation, smoothly and quickly mill up the fish to the desired degree of fineness without tending to merely shove the fish to one side and go on. The cutter always fills the hole and so prevents the fish, except in small pieces, from rising past the cutter.

The large number of blades and the continuity of edges 66 make for smoothness in running and eliminates any danger of hanging up or catching on foreign objects.

The exact blade motion will vary from a reciprocating or hammering action, when the cutter does not rotate, to a rolling and crushing motion when the cutter revolves freely in the hole. This combination of blade outline and motion is very effective in breaking up and removing fish regardless of size.

In most formations it has been found desirable to decrease the reaming action, and the shorter reaming sections, as in Fig. 2, are used. Also, general work in rock formations has shown the desirability of the notched blades as in Fig. 4.

All forms of tooth outline have in common the same rolling motion as the shank rotates in the well causing the cutter to revolve on its bearing and to bring the blades successively into digging position. This rolling motion causes the blades to break down the formation with mainly a slicing or crushing action that makes for rapid, efficient cutting and long life of the cutter.

Having described my invention, it is to be understood that various changes from the foregoing in shape and outline may be made by those skilled in the art and still be within the broad scope of my invention as defined by the following claims.

I claim as my invention:

1. A cutter for a drill bit of the gyratory type, comprising a bowl-shaped body with an internal cavity adapted to receive a shank bearing, and a cutter blade extending outwardly from the body; said blade having a lower digging section of generally triangular cross-section with its apex forming a continuous cutting edge extending longitudinally of the blade.

2. A cutter for a drill bit of the gyratory type, comprising a bowl-shaped body with an internal cavity adapted to receive a shank bearing, and a cutter blade extending outwardly from the body; said blade having a lower digging section of generally triangular cross-section with its apex forming a continuous cutting edge extending longitudinally of the blade, the cutting edge being of arcuate outline.

3. A cutter for a drill bit of the gyratory type, comprising a bowl-shaped body with an internal cavity adapted to receive a shank bearing, and a cutter blade extending outwardly from the body; said blade having a lower digging section of generally triangular cross-section with its apex forming a continuous cutting edge extending longitudinally of the blade, the cutting edge being of arcuate outline with its center of curvature between the blade and the cutter axis.

4. A cutter for a drill bit of the gyratory type, comprising a bowl-shaped body with an internal cavity adapted to receive a shank bearing and a cutter blade extending outwardly from the body; said blade having a lower digging section of generally triangular cross-section with its apex forming a continuous cutting edge extending longitudinally of the blade, the cutting edge being of arcuate outline but lying entirely inside a sphere concentric with the cutter center and of a diameter equal to the cutter nominal diameter.

5. A cutter for a drill bit of the gyratory type, comprising a bowl-shaped body with an internal cavity adapted to receive a shank bearing, and a cutter blade extending outwardly from the body; said blade having a lower digging section of generally triangular cross-section with its apex forming a continuous cutting edge extending longitudinally of the blade, the cutting edge being of arcuate outline and of progressively changing radius relative to the cutter center.

6. A cutter for a drill bit of the gyratory type, comprising a bowl-shaped body with an internal cavity adapted to receive a shank bearing and a cutter blade extending outwardly from the body; said blade having an upper reaming section of generally rectangular cross-section and formed with a plurality of transverse cutting edges, all of said transverse edges lying in an arcuate outline; and said blade having a lower digging section of generally triangular cross-section with its apex forming a continuous cutting edge extending longitudinally of the blade in arcuate outline.

7. A cutter for a drill bit of the gyratory type, comprising a bowl-shaped body with an internal cavity adapted to receive a shank bearing and a plurality of cutting blades extending outwardly from the body; each blade having a lower digging section of generally triangular cross-section forming a continuous cutting edge extending longitudinally of the blade, and having an upper reaming section generally rectangular in cross-section, alternate blades having reaming sections with a plurality of transverse cutting edges lying in an arcuate outline, and the remaining blades having shortened reaming sections with a single terminal cutting edge.

8. A cutter for a drill bit of the gyratory type, comprising a bowl-shaped body with an internal cavity adapted to receive a shank bearing, and a cutter blade extending outwardly from the body; said blade having a lower digging section formed with a cutting edge extending longitudinally of the blade, the cutting edge being of spiral outline relative to the cutter center, and the radius of the cutting edge about the cutter center continuously decreasing downwardly of the blade.

9. A cutter for a drill bit of the gyratory type, comprising a bowl-shaped body with an internal cavity adapted to receive a shank bearing and a cutter blade extending outwardly from the body; said blade having an upper reaming section of generally rectangular cross-section and formed with a plurality of transverse cutting edges, all of said transverse edges lying in a vertical arc having its center at the cutter center; and said blade having a lower digging section of generally triangular cross-section with its apex forming a cutting edge of vertically arcuate outline, the radius of the cutting edge about the cutter center continuously decreasing downwardly of the blade.

JOHN A. ZUBLIN.